(12) United States Patent
Fein et al.

(10) Patent No.: US 7,636,758 B1
(45) Date of Patent: *Dec. 22, 2009

(54) ADVERTISEMENT FORWARDING STORAGE AND RETRIEVAL NETWORK

(76) Inventors: Gene Fein, 29712 Zuma Bay Way, Mailibu, CA (US) 90265; Edward Merritt, 139 Lime Kiln Rd., Lenox, MA (US) 01240

( * ) Notice: Subject to any disclaimer, the term of this patent is extended or adjusted under 35 U.S.C. 154(b) by 0 days.

This patent is subject to a terminal disclaimer.

(21) Appl. No.: 12/170,925

(22) Filed: Jul. 10, 2008

(51) Int. Cl.
*G06F 15/167* (2006.01)

(52) U.S. Cl. .................................................. 709/212

(58) Field of Classification Search ................ 709/251, 709/216, 238, 212; 710/100
See application file for complete search history.

(56) References Cited

U.S. PATENT DOCUMENTS

| | | | | |
|---|---|---|---|---|
| 3,786,424 | A | 1/1974 | McVoy et al. | 340/151 |
| 5,787,258 | A * | 7/1998 | Costa et al. | 709/251 |
| 6,085,030 | A | 7/2000 | Whitehead et al. | 395/200.33 |
| 6,151,395 | A * | 11/2000 | Harkins | 380/286 |
| 6,684,258 | B1 * | 1/2004 | Gavin et al. | 709/251 |
| 6,983,303 | B2 | 1/2006 | Pellegrino et al. | 709/203 |
| 7,143,170 | B2 * | 11/2006 | Swildens et al. | 709/226 |
| 7,404,002 | B1 * | 7/2008 | Pereira | 709/231 |
| 2002/0158899 | A1 | 10/2002 | Raymond | 345/736 |
| 2002/0194371 | A1 * | 12/2002 | Kadoi | 709/239 |
| 2004/0223503 | A1 * | 11/2004 | Lynch et al. | 370/404 |
| 2005/0201409 | A1 * | 9/2005 | Griswold et al. | 370/445 |
| 2005/0240749 | A1 | 10/2005 | Clemo et al. | 711/170 |
| 2005/0243823 | A1 * | 11/2005 | Griswold et al. | 370/389 |
| 2006/0031593 | A1 * | 2/2006 | Sinclair | 709/251 |
| 2007/0195772 | A1 * | 8/2007 | Shadish | 370/390 |
| 2007/0271349 | A1 | 11/2007 | Clemo et al. | 709/211 |
| 2009/0067322 | A1 * | 3/2009 | Shand et al. | 370/225 |

FOREIGN PATENT DOCUMENTS

WO 2007/021289 2/2007

* cited by examiner

*Primary Examiner*—J Bret Dennison
(74) *Attorney, Agent, or Firm*—Chinh H. Pham; Greenberg Traurig, LLP

(57) ABSTRACT

Methods and apparatus, including computer program products, for to advertisement forwarding storage and retrieval network. A method includes, in a network of interconnected computer system nodes, directing advertisement to a computer memory, directing data to a computer memory, continuously forwarding each of the unique data, independent of each other, from one computer memory to another computer memory in the network of interconnected computer system nodes without storing on any physical storage device in the network, continuously forwarding each of the unique advertisements, independent of each other, from one computer memory to another computer memory in the network of interconnected computer system nodes without storing on any physical storage device in the network, and retrieving one of the advertisements in response to an activity.

20 Claims, 6 Drawing Sheets

ADVERTISEMENT FORWARDING STORAGE AND RETRIEVAL NETWORK

CROSS-REFERENCES TO RELATED APPLICATIONS

The present patent application is related to U.S. Ser. No. 12/046,757, filed on Mar. 12, 2008; U.S. Ser. No. 12/052,345, filed on Mar. 20, 2008; U.S. Ser. No. 12/099,498, filed on Apr. 8, 2008; U.S. Ser. No. 12/109,458, filed on Apr. 25, 2008; U.S. Ser. No. 12/116,610, filed on May 7, 2008; U.S. Ser. No. 12/132,804, filed on Jun. 4, 2008; U.S. Ser. No. 12/170,901, filed on Jul. 10, 2008; and U.S. Ser. No. 12/184,866, filed on Aug. 1, 2008.

BACKGROUND

At least some embodiments disclosed herein relate to data storage, and more particularly, to advertisement forwarding storage and retrieval network.

The volume of data that must be stored by individuals, organizations, businesses and government is growing every year. In addition to just keeping up with demand, organizations face other storage challenges. With the move to on-line, real-time business and government, critical data must be protected from loss or inaccessibility due to software or hardware failure. Today, many storage products do not provide complete failure protection and expose users to the risk of data loss or unavailability. For example, many storage solutions on the market today offer protection against some failure modes, such as processor failure, but not against others, such as disk drive failure. Many organizations are exposed to the risk of data loss or data unavailability due to component failure in their data storage system.

The data storage market is typically divided into two major segments, i.e., Direct Attached Storage (DAS) and Network Storage. DAS includes disks connected directly to a server.

Network Storage includes disks that are attached to a network rather than a specific server and can then be accessed and shared by other devices and applications on that network. Network Storage is typically divided into two segments, i.e., Storage Area Networks (SANs) and Network Attached Storage (NAS).

A SAN is a high-speed special-purpose network (or subnetwork) that interconnects different kinds of data storage devices with associated data servers on behalf of a larger network of users. Typically, a SAN is part of the overall network of computing resources for an enterprise. A storage area network is usually clustered in close proximity to other computing resources but may also extend to remote locations for backup and archival storage, using wide area (WAN) network carrier technologies.

NAS is hard disk storage that is set up with its own network address rather than being attached to the local computer that is serving applications to a network's workstation users. By removing storage access and its management from the local server, both application programming and files can be served faster because they are not competing for the same processor resources. The NAS is attached to a local area network (typically, an Ethernet network) and assigned an IP address. File requests are mapped by the main server to the NAS file server.

All of the above share one common feature that can be an Achilles tendon in more ways than one, i.e., data is stored on a physical medium, such as a disk drive, CD drive, and so forth.

SUMMARY OF THE DESCRIPTION

The present invention provides methods and apparatus, including computer program products, for advertisement forwarding storage and retrieval network.

In general, in one aspect, the invention features a method including, in a network of interconnected computer system nodes, directing advertisement to a computer memory, directing data to a computer memory, continuously forwarding each of the unique data, independent of each other, from one computer memory to another computer memory in the network of interconnected computer system nodes without storing on any physical storage device in the network, continuously forwarding each of the unique advertisements, independent of each other, from one computer memory to another computer memory in the network of interconnected computer system nodes without storing on any physical storage device in the network, and retrieving one of the advertisements in response to an activity.

In another aspect, the invention features a network including a group of interconnected computer system nodes each adapted to receive data and advertisements, continuously forward the data and advertisements from computer memory to computer memory, independent of each other, without storing on any physical storage device in response to a request to store the data or advertisements from a requesting system and retrieve a particular data being continuously forwarded from computer memory to computer memory, along with an advertisement being continuously forwarded from computer memory to computer memory, in response to an activity of the requesting system.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

The embodiments are illustrated by way of example and not limitation in the FIGs. of the accompanying drawings in which like references indicate similar elements.

DETAILED DESCRIPTION

Unlike peer to peer networks, which use data forwarding in a transient fashion so that data is eventually stored on a physical medium such as a disk drive, the present invention is a continuous data forwarding system, i.e., data is stored by continually forwarding it from one node memory to another node memory.

Figure 1:
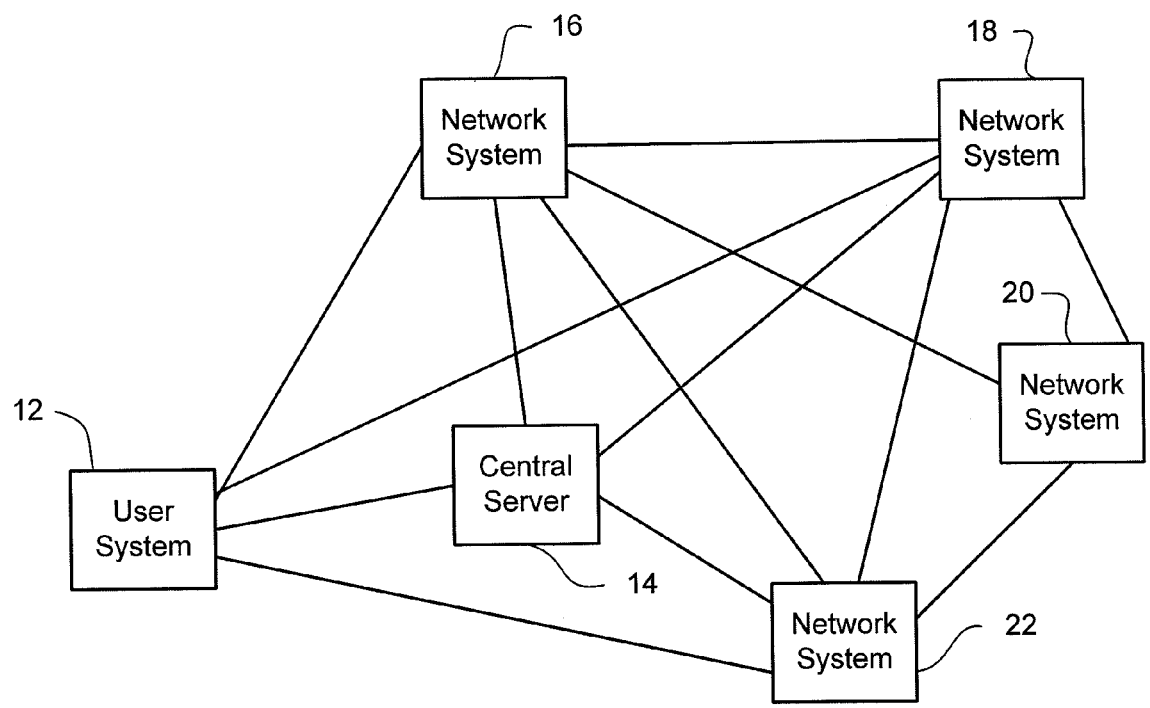
FIG. 1 is a block diagram of an exemplary network.

As shown in FIG. 1, an exemplary network 10 includes a user system 12 and a number of network systems 14, 16, 18, 20, 22. Each of the network systems 14, 16, 18, 20, 22 can be considered to be a node in the network 10 and one such network system may be designated as a central server, such as network system 14, which may assume a control position in network 10. Each of the nodes 14, 16, 18, 20, 22 may be established as a privately controlled network of peers under direct control of the central server 14. Peered nodes may also be a mix of private and public nodes, and thus not under the direct physical control of the central server 14. The network 10 may also be wholly public where the central server 14 (or servers) has no direct ownership or direct physical control of any of the peered nodes.

Figure 2:
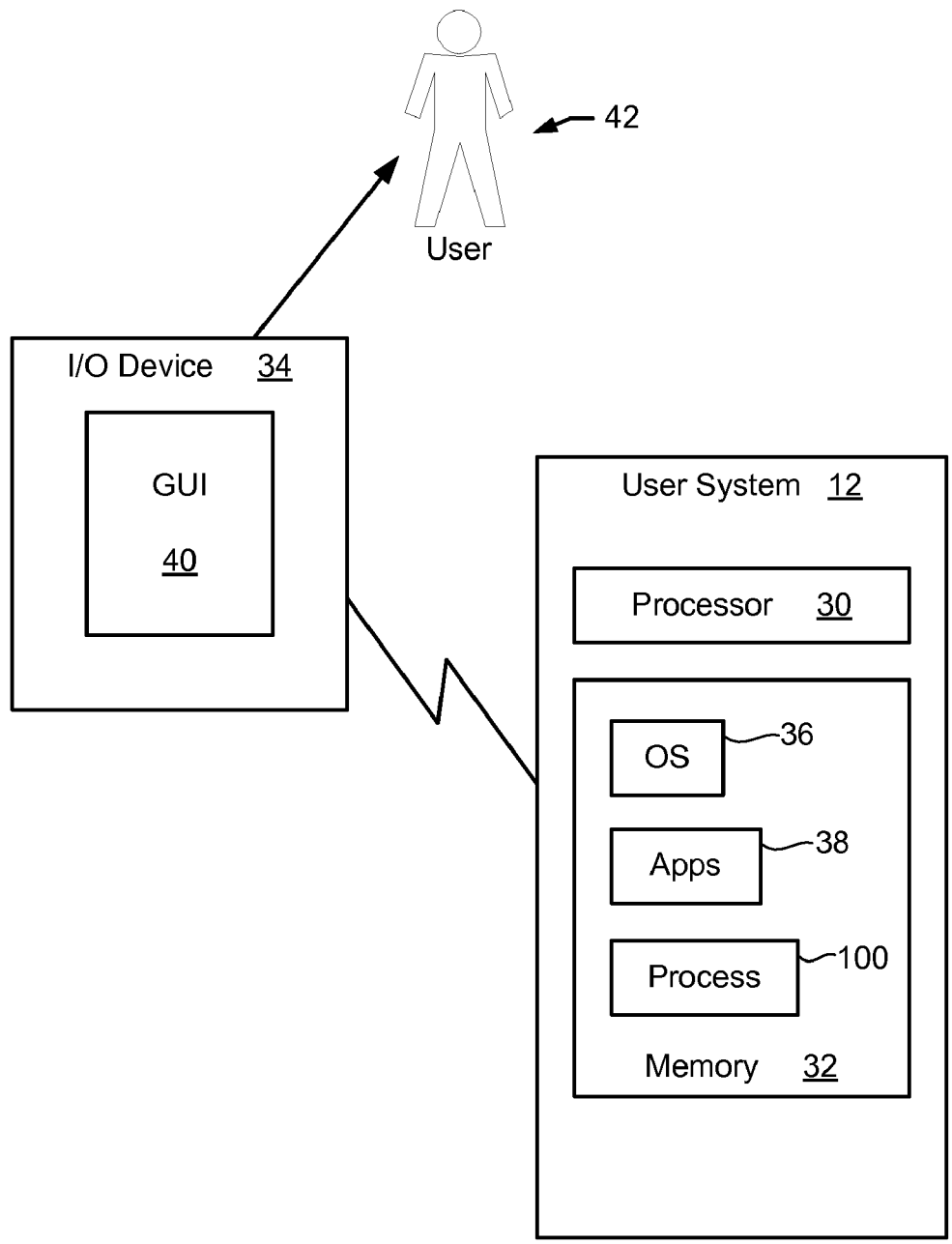
FIG. 2 is a block diagram of an exemplary user system.

As shown in FIG. 2, the user system 12 can include a processor 30, memory 32 and input/output (I/O) device 34. Memory 32 can include an operating system (OS) 36, such as Linux, Apple® OS or Windows®, one or more application processes 38, and a storage process 100, explained in detail below. Application processes 38 can include user productivity software, such as OpenOffice or Microsoft™ Office. The I/O device 34 can include a graphical user interface (GUI) 40 for display to a user 42.

Figure 3:
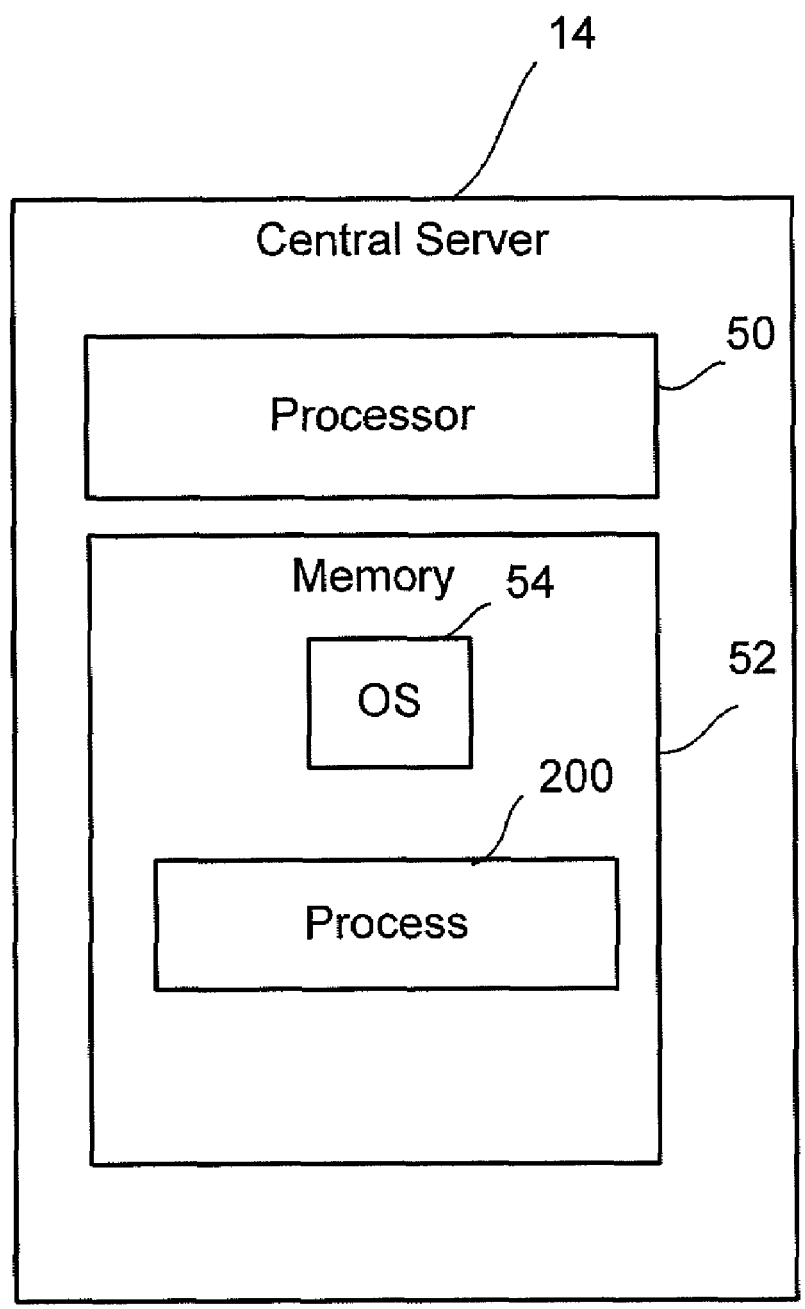
FIG. 3 is a block diagram of an exemplary network system.

As shown in FIG. 3, each of the network systems, such as network system 14, can include a processor 50 and memory 52. Memory 52 can include an OS 54, such as Linux, Apple® OS or Windows®, and a data forwarding process 200, explained in detail below.

In traditional systems, application processes 38 need to store and retrieve data. In these traditional systems, data is stored on local or remote physical devices. And in some systems, this data can be segmented into different pieces or packets and stored locally or remotely on physical mediums of storage. Use of fixed physical data storage devices add cost, maintenance, management and generate a fixed physical record of the data, whether or not that is the desire of the user 42.

The present invention does not use fixed physical data storage to store data. When a request to store data is received by the central server 14 from storage process 100, data is directed to a node in the network 10 where it is then continuously forwarded from node memory to node memory in the network 10 by the data forwarding process 200 in each of the network nodes without storing on any physical storage medium such as a disk drive. The forwarded data resides only for a very brief period of time in the memory of any one node in the network 10. Data is not stored on any physical storage medium in any network node.

In a like manner, when a request to retrieve data is received by the central server 14 from storage process 100, the requested data, which is being forwarded from node memory to node memory in the network 10, is retrieved.

Data forwarded in this manner can be segmented and segments forwarded as described above. Still, the segmented data is not stored on any physical storage medium in any network node, but merely forwarded from the memory of one node to the memory of another node.

Figure 4:
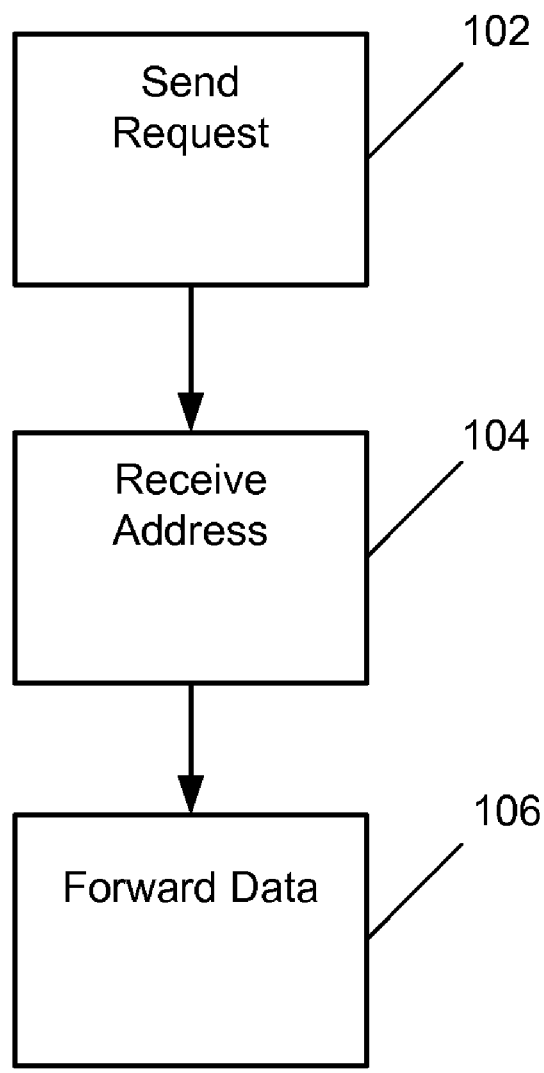
FIG. 4 is a flow diagram of a process.

As shown in FIG. 4, storage process 100 includes sending (102) a request to a central server 14 to store or retrieve data. If the request is a retrieve data request, storage process 100 receives the requested data from the central server 14 or node in the network.

If the request to the central server 14 is a store data request, storage process 100 receives (104) an address of a node from the central server 14 and forwards (106) the data to the node memory represented by the received address. Determining an address of a node available to receive the data can be based on one or more factors, such as network traffic analysis, available memory, combinations of factors, and so forth. A time stamp can be applied to the data in the computer memory of the specific node.

Figure 5:
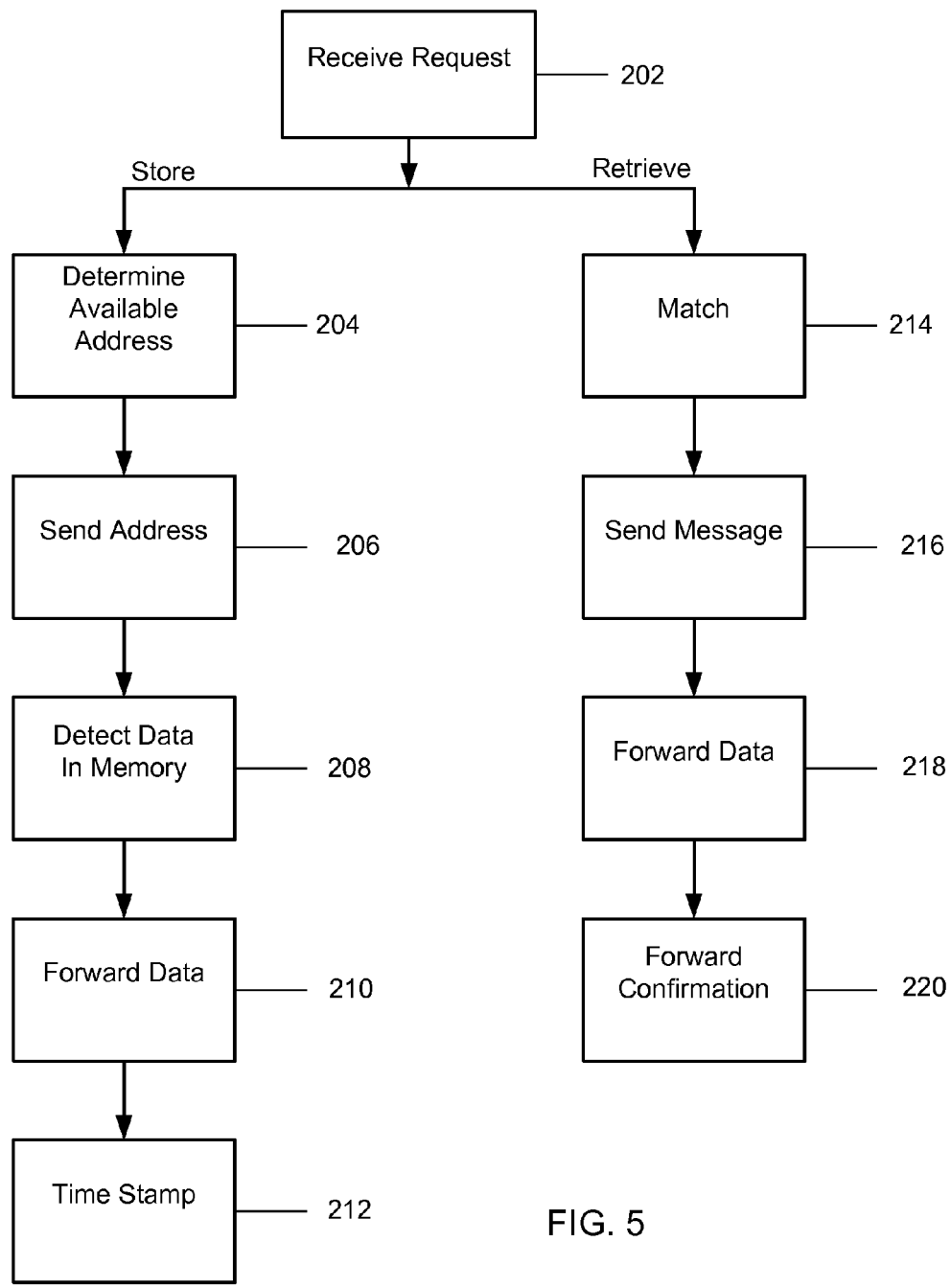
FIG. 5 is a flow diagram of a process.

As shown in FIG. 5, data forwarding process 200 includes receiving (202) a request to store or retrieve data. If the received request is a request to store data, data forwarding process 200 determines (204) an address of a node available to receive the data in memory. This determination (204) can include pinging the network and determining which of the nodes in a network is available, or determining which node in the network has the least traffic, or determining which node in the network has the largest available memory, or any combination of these or other factors.

Process 200 sends (206) a message to the user system with the address of a specific node for the requester to forward the data.

Process 200 detects (208) the presence of data in node memory. Process 200 forwards (210) the data in memory to another node in the network of nodes and continues to repeat detecting (208) and forwarding (210) of the data from node memory to node memory. When data arrives in any node memory, process 200 affixes (212) a time stamp to the data.

Forwarding (210) can include pinging the node in the network to determine which of the nodes in the network is available, or determining which node in the network has the least traffic, or determining which node in the network has the largest available memory, or any combination of these or other factors.

In one specific example, at the point of entry to a node, data undergoes an encrypted "handshake" with the node or central server 14 or user. This can be a public or private encryption system, such as the Cashmere system, which can use public-private keys. Cashmere decouples the encrypted forwarding path and message payload, which improves the performance as the source only needs to perform a single public key encryption on each message that uses the destination's unique public key. This has the benefit that only the true destination node will be able to decrypt the message payload and not every node in the corresponding relay group. Cashmere provides the capability that the destination can send anonymous reply messages without knowing the source's identity. This is done in a similar way, where the source creates a reply path and encrypts it in a similar manner as the forwarding path.

In another example, other routing schemes are utilized.

If the received request is a request to retrieve data being continuously forwarded from node memory to node memory, data forwarding process 200 matches (214) at the central server 14 using a hash mark or other unique code that can be "sniffed" by the node upon the data entering the node via the encryption handshake. This can occur by pinging the nodes in the network. Process 200 sends (216) the message to return the data to the user directly to the node or node state where the central server 14 believes the data will likely appear. The more the central server 14 can narrow the node state that it pings to, then the more efficient the retrieval will become and the less burdened by unnecessary messaging traffic to nodes that are not necessary for a transaction between the central server 14 and the node capable of forwarding the data.

Once the correct node receives the message to forward the data in node memory to the requester, process 200 forwards (218) in node memory the data to the requester and forwards (220) a confirmation message that the data has been sent to the user. This routing message may be sent directly to the central server 14 or may be passed to the central server 14 or servers via other node(s) or supernode(s) in the network 10. Upon the user receiving the requested data the user's application functions to automatically ping the central server 14 that the data requested has been received. Thus the network 10 creates data storage without caching, downloading and/or storing the data on any physical storage medium. Data storage and management is accomplished via a continuous routing of the data from node memory to node memory, the forwarded data only downloaded when the user requests the data to be returned to the user from the network 10.

New nodes and node states may be added and/or deleted from the network 10 based upon performance. Users may have access to all nodes or may be segmented to certain nodes or "node states" by the central server(s) or via the specific architecture of the private, public or private-public network.

Individual nodes, nodes states and supernodes may also be extranet peers, wireless network peers, satellite peered nodes, Wi-Fi peered nodes, broadband networks, and so forth, in public or private networks. Peered nodes or users may be used as routing participants in the network 10 from any valid peer point with the same security systems employed, as well as custom solutions suitable for the rigors of specific deployments, such as wireless encryption schemes for wireless peers, and so forth.

In process 200, rather than have data cached or held in remote servers, hard drives or other fixed storage medium, the data are passed, routed, forwarded from node memory to node memory. The data are never downloaded until the authorized user calls for the data. A user on the system may authorize more than one user to have access to the data.

A primary goal in process 200 is to generate a data forwarding storage and management system where the data is never fixed in physical storage, but in fact, is continually being routed/forwarded from node memory to node memory in the network. The path of the nodes to which data is forwarded may also be altered by the central server 14 to adjust for system capacities and to eliminate redundant paths of data that may weaken the security of the network due to the increased probability of data path without this feature.

This data forwarding storage and management system in which the data is never fixed in physical storage, but in fact, is continually being routed/forwarded from node memory to node memory in the network, can be used as a backend system(s) in many applications that currently used fixed medium storage. In one example, this data forwarding storage and management system where the data is continually being routed/forwarded from node memory to node memory in the network is used as an advertisement forwarding and retrieval system. Advertisement is deployed into the data forwarding storage and management system from a master server or control station and recalled on demand or in response to a stimulus or activity. Here, we consider advertisement as a broad term that can include any content, including, but limited to, text, audio, visual or any combination thereof. Advertisement can be deployed into the data forwarding storage network and recalled/retrieved when needed, e.g., directed to an IP address of a specific user system, directed to paid and/or unpaid subscribers of applications within the data forwarding storage network, and/or directed to users outside of the data forwarding storage network. Advertisement being continuously forwarded in the data forwarding storage network can be sent to all users or specifically targeted according to one or more user characteristics, user profiles, usage patterns, history and/or past or present viewed page content. The advertisement being continuously forwarded in the data forwarding storage network can be displayed to a current user within an application or web browser or delivered to a wired or wireless radio, television and/or television network. Advertisements can be retrieved in response to a stimulus or activity, such as the user's profile, traffic patterns of one or more users, application profiles, and so forth. Advertisements can be stored and delivered in any media form and either pre-configured by specific file type and size for a specific end user or site delivery requirements/formats, or delivered and formatted by virtue of the end user or middleware software compatibility systems.

In one example, selected advertisement can be delivered to a user through a web browser. More particularly, a plug-in and/or helper application can be associated with a user's web browser. In general, a plug-in is a computer program that interacts with a host application (a web browser or an email client, for example) to provide a certain, usually very specific, function "on demand." As a user navigates to a particular web page, the plug-in can parse displayed text. The plug-in can then request specific advertisement being continuously forwarded in the data forwarding storage network that matches the parsed text to the web browser of the user for display in a section of the display screen or as a pop-up.

In another example, a user requesting retrieval of a data file being continuously forwarded in the data forwarding storage network may be presented with specific advertisement being continuously forwarded in the data forwarding storage network that matches the user's profile. The user's profile may include various personal and/or demographic data that aids in directing appropriate advertisement to the user. The advertisement may then be displayed as a banner or in a shared window or in a separate window.

In each of the examples above, the network includes a group of interconnected computer system nodes each adapted to receive data and advertisement and continuously forward the data and advertisement from computer memory to computer memory, independent of each other, without storing on any physical storage device, in response to a request to store the data from a requesting system and retrieve data being continuously forwarded from computer memory to computer memory in response to a request to retrieve the data from the requesting system. Each node in the network is adapted to detect the presence of a data and advertisement in its memory and forward the data and advertisement to a computer memory of another node in the interconnected computer systems nodes according to a node's availability. The node's availability can be determined according to its volume of network traffic. Each node can encrypt the data.

A central node can be adapted to match the data retrieval request at a central server using a hash mark representing the data or advertisement entering a node, send a message to a node that is predicted to have the data or advertisement in memory, the message instructing the node to forward the data and/or advertisement in memory to the requester, and send a confirmation message to the central server that the data or advertisement in memory has been forwarded to the requester.

Figure 6:
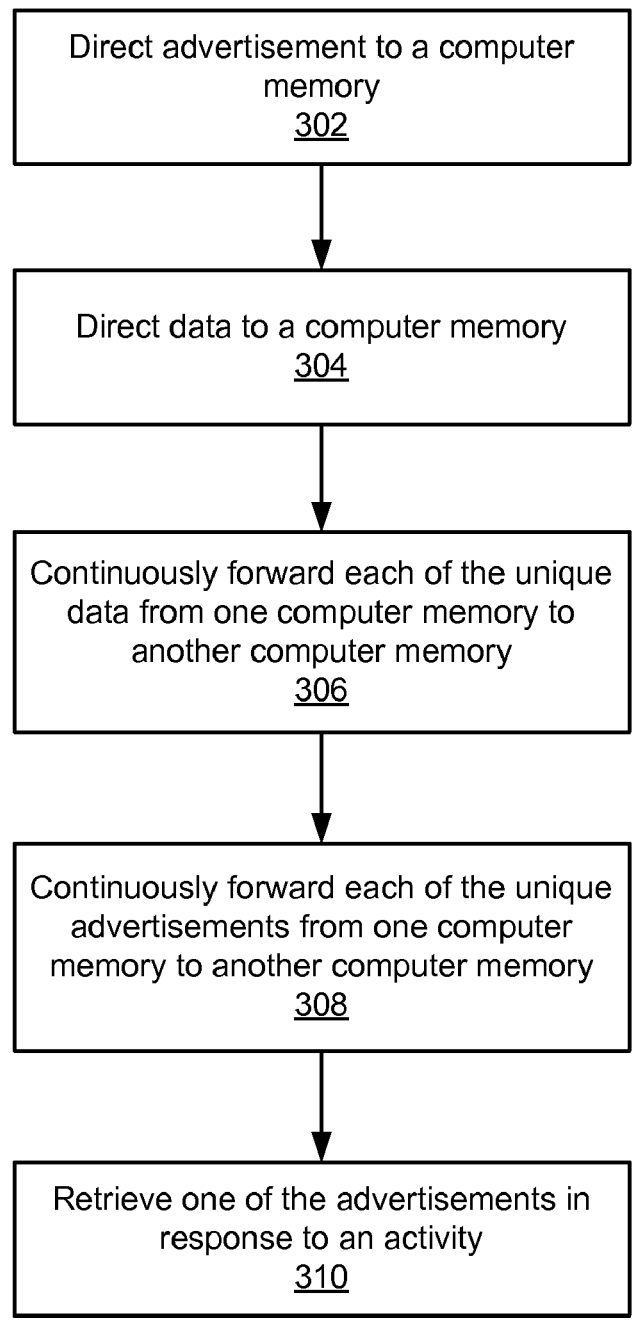
FIG. 6 is a flow diagram of a process.

As shown in FIG. 6, a process 300 includes directing (302) advertisement to a computer memory. The advertisement can include any content, including, but limited to, text, audio, visual or any combination thereof. The advertisement can include multiple configurations in order to satisfy different systems delivery specifications. Advertisements can be stored and delivered in any media form and either pre-configured by specific file type and size for a specific end user or site delivery requirements/formats, or delivered and formatted by virtue of the end user or middleware software compatibility systems.

Process 300 directs (304) data to a computer memory.

Process 300 continuously forwards (306) each of the unique data, independent of each other, from one computer memory to another computer memory in the network of interconnected computer system nodes without storing on any physical storage device in the network.

Process 300 continuously forwards (308) each of the unique advertisements, independent of each other, from one computer memory to another computer memory in the network of interconnected computer system nodes without storing on any physical storage device in the network.

Process 300 retrieves (310) one of the advertisements in response to an activity.

The invention can be implemented to realize one or more of the following advantages. A network creates data storage without caching or downloads. Data storage and management are accomplished via a constant routing of the data.

Embodiments of the invention can be implemented in digital electronic circuitry, or in computer hardware, firmware, software, or in combinations of them. Embodiments of the invention can be implemented as a computer program product, i.e., a computer program tangibly embodied in a computer readable medium, e.g., in a machine readable storage device for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method comprising:
   in a network of interconnected computer system nodes, directing a plurality of advertisement to a node;
   directing a plurality of unique data items to a node;
   in response to a request from a source system, continuously forwarding each of the unique data items, independent of each other, among the nodes in the network of interconnected computer system nodes without storing the forwarded data items on any fixed storage medium in the network, the forwarded data items being constantly routed within the network from node to node, the forwarded data items being available for retrieval if a request to retrieve the data items is received;
   storing the advertisements by continuously forwarding each of the unique advertisements, independent of each other, among the nodes in the network of interconnected computer system nodes without storing the forwarded advertisements on any fixed storage medium in the network, the forwarded advertisements being constantly routed within the network from node to node; and
   retrieving one of the advertisements in response to an activity.

2. The method of claim 1 wherein continuously forwarding further comprises:
   detecting a presence of any one of the unique data items or advertisements at a specific node; and
   forwarding the one of the unique data items or advertisements to another node in the network of interconnected computer system nodes without storing the forwarded data items on any fixed storage medium.

3. The method of claim 2 wherein forwarding comprises determining an address of a node available to receive the unique data items or advertisement based on one or more factors.

4. The method of claim 3 wherein the one or more factors comprise network traffic analysis and available memory.

5. The method of claim 1 further comprising:
   receiving a request from the source system to retrieve at least one of the data items being continuously forwarded in the network of interconnected computer system nodes;
   retrieving the at least one of the data items from a node in response to the request to retrieve the at least one of data items; and
   matching a user of the request to an activity to target specific advertisement to be retrieved.

6. The method of claim 5 wherein retrieving comprises:
   matching the data item or advertisement request at a central server using a hash mark representing the data item and advertisement entering a node;
   sending a message to a node that is predicted to have the data item or advertisement, the message instructing the node to forward the data item or advertisement to the source system; and
   sending a confirmation message to the central server that the data item and advertisement have been forwarded to the source system.

7. The method of claim 6 further comprising receiving an acknowledgment from the source system that the requested data item has been received.

8. A network comprising:
   a group of interconnected computer system nodes, each node configured to:
      in response to a request from a requesting system to store data items or advertisements, receive at least one data item and advertisement and continuously forward the data items and advertisements among the computer system nodes, independent of each other, without storing the forwarded data items and advertisements on any fixed storage medium, the forwarded data items and advertisements being constantly routed from node to node within the group of interconnected computer system nodes; and in response to an activity of the requesting system, retrieve a particular data item being continuously forwarded among the computer system nodes, along with an advertisement being continuously forwarded among the computer system nodes.

9. The network of claim 8 wherein each node is:

adapted to detect the presence of data items and forward the data items to another node in the group of interconnected computer systems nodes according to a node's availability; and adapted to detect the presence of advertisement and forward the advertisement to another node in the group of interconnected computer systems nodes according to a node's availability.

10. The network of claim 9 wherein the node's availability is determined according to its volume of network traffic.

11. The network of claim 10 wherein each node encrypts the data item or advertisement.

12. The network of claim 10 wherein the group of nodes comprises a central server to:

match the data item retrieval request using a hash mark representing the data item or advertisement entering a node;

send a message to a node that is predicted to have the data item or advertisement, the message instructing the node to forward the data item or advertisement to the requesting system; and receive a confirmation message that the data item or advertisement has been forwarded to the requesting system.

13. A tangible computer readable medium embodying instructions for causing a data processing apparatus to perform a method for storing and retrieving data items and advertisements in a network of interconnected computer system nodes, the method comprising:

directing a plurality of advertisement to a node;

directing a plurality of unique data items to a node;

in response to a request from a source system, continuously forwarding each of the unique data items, independent of each other, among the nodes in the network of interconnected computer system nodes without storing the forwarded data items on any fixed storage medium in the network, the forwarded data items being constantly routed within the network from node to node, the forwarded data items being available for retrieval if a request to retrieve the data items is received;

in response to the request from the source system, continuously forwarding each of the unique advertisements, independent of each other, among the nodes in the network of interconnected computer system nodes without storing the forwarded advertisements on any fixed storage medium in the network, the forwarded advertisements being constantly routed within the network from node to node; and retrieving one of the advertisements in response to an activity.

14. The computer readable medium of claim 13 wherein continuously forwarding further comprises:

detecting a presence of any one of the unique data items or advertisement at a specific node; and forwarding the one of the unique data items or advertisement to another node in the network of interconnected computer system nodes without storing the forwarded data item or advertisement on any fixed storage medium.

15. The computer readable medium of claim 14 wherein forwarding comprises determining an address of a node available to receive the unique data item or advertisement based on one or more factors.

16. The computer readable medium of claim 15 wherein the one or more factors comprise network traffic analysis and available memory.

17. The computer readable medium of claim 13 wherein the method further comprises:

receiving a request from the source system to retrieve at least one of the data items or advertisement being continuously forwarded in the network of interconnected computer system nodes; and retrieving the at least one of the data items or advertisement from a node in response to the request to retrieve the at least on of the data items or advertisement; and matching a user of the request to an activity.

18. The computer readable medium of claim 17 wherein retrieving comprises:

matching the data item or advertisement request at a central server using a hash mark representing the at least one data item or advertisement entering a node;

sending a message to a node that is predicted to have the at least one data item or advertisement, the message instructing the node to forward the at least one data item or advertisement to the source system; and sending a confirmation message to the central server that the at least one data item or advertisement have been forwarded to the source system.

19. The computer readable medium of claim 18 wherein the method further comprises receiving an acknowledgment from the source system that the requested at least one data item has been received.

20. The computer readable medium of claim 13 wherein the advertisement includes any of text, audio, visual, multiple configurations in order to satisfy different systems delivery specifications, or any combination thereof.

* * * * *